J. PATTERSON.
Draught-Faucets for Soda-Water Apparatus.

No. 137,620. Patented April 8, 1873.

WITNESSES
Hubert Howson
Harry Smith

James Patterson
by his Att'y.
Howson and Son

UNITED STATES PATENT OFFICE.

JAMES PATTERSON, OF PHILADELPHIA, PENNSYLVANIA, ASSIGNOR TO CHARLES LIPPINCOTT & CO., OF SAME PLACE.

IMPROVEMENT IN DRAFT-FAUCETS FOR SODA-WATER APPARATUS.

Specification forming part of Letters Patent No. 137,620, dated April 8, 1873; application filed December 2, 1872.

*To all whom it may concern:*

Be it known that I, JAMES PATTERSON, of Philadelphia, Pennsylvania, have invented an Improved Draft-Faucet for Soda-Water Apparatus, of which the following is a specification:

The object of my invention is to discharge from a soda-water fountain, first a small and then a larger stream of soda-water, and to shut off both streams simultaneously, so that the attendant can have the desired control of the liquid to enable him to furnish it to customers in proper condition.

Figure 1:
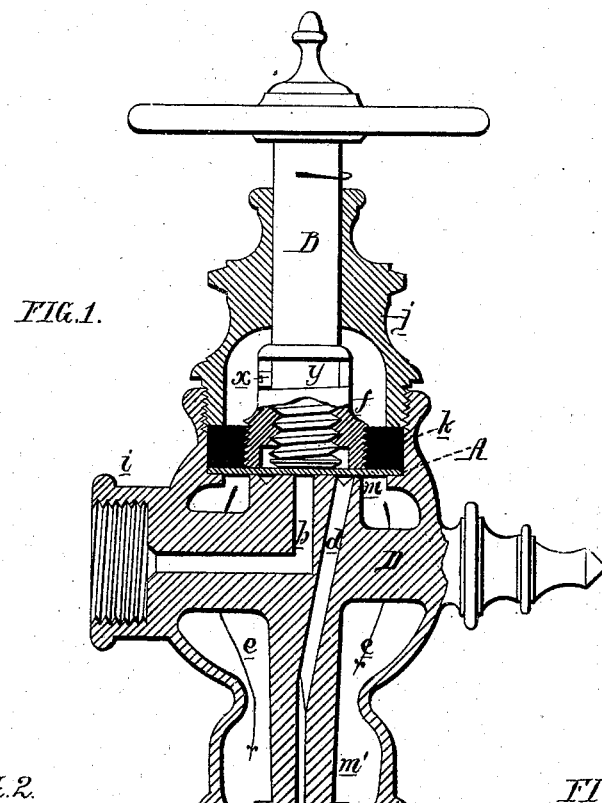

I attain this object by combining in the faucet of a soda-water fountain an elastic diaphragm, A, with an inlet-passage, $b$, an outlet-passage, $d$, and chamber $e$, in the manner illustrated in the vertical section, Figure 1 of the accompanying drawing, the said diaphragm being so controlled by the screw-spindle B and nut $f$ that it can be so far elevated as to permit the liquid to escape in a small stream through the passage $d$ only, or still further elevated so as to permit the liquid to pass in a larger stream into the chamber $e$, and thence through the discharge-nozzle $h$. The outer case of the faucet has a branch, $i$, for attachment to a soda-water fountain, and a screw-cap, $j$, which serves to force a ring, $k$, against the elastic diaphragm A, the latter bearing on a shoulder in the interior of the casing. The seat $m$ for the diaphragm is on a cross-piece, D, which extends across the chamber $e$ and contains the above-mentioned passages $b$ and $d$, the latter being continued through a nozzle, $m'$, contained within the larger nozzle $h$. The lower threaded end of the spindle B bears on the diaphragm A, and is adapted to a nut, $f$, which also bears on the diaphragm when the faucet is closed, as shown in Fig. 1, and is arranged to screw into the ring $k$. The spindle has a pin, $x$, passing through a slot in the nut, so that the former can be turned independently of the latter to a limited extent.

Figure 2:
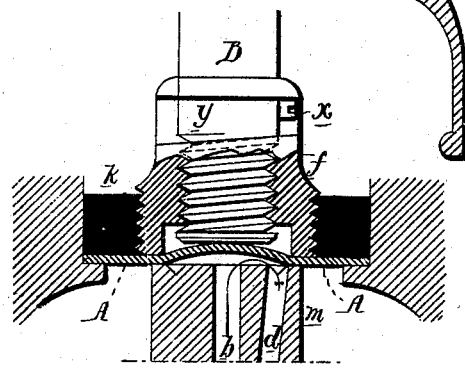
Figure 3:
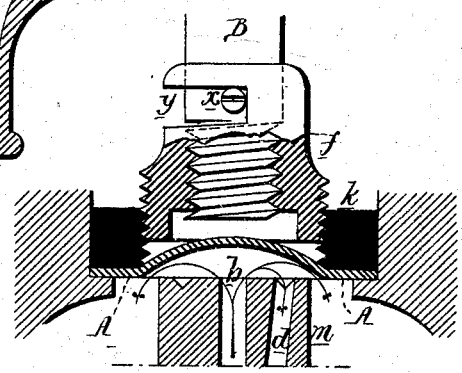

Supposing the faucet to have been closed by the depression of the diaphragm to its seat, as shown in Fig. 1, the first result of turning the spindle in the direction of the arrow will be the relieving of the central portion of the diaphragm from pressure, while the nut $f$ continues to depress a portion of the diaphragm to its seat, as shown in Fig. 2, so that the soda-water is free to traverse the passages $b$ and $d$ and to escape in a small stream through the inner nozzle $h$. On continuing to turn the spindle B in the direction of the arrow, the pin $x$ will strike the end of the slot $y$ in the nut $f$, when the latter will be turned with the spindle and unscrewed from the ring $k$, and the diaphragm will be further elevated by the soda-water, and a larger stream of the latter will escape in the direction pointed out by the arrows, Fig. 3, into the chamber $e$, and thence through the nozzle $h$. On turning the spindle in a contrary direction to that pointed out by the arrow, the nut will remain stationary until the pin $x$ strikes the end of the slot $y$, after which both spindle and nut will descend simultaneously and close the diaphragm.

I claim as my invention—

1. The combination, with the passages $b$ and $d$ and chamber $e$, of the elastic diaphragm A and the slotted nut $f$, spindle B and its pin $x$, or their equivalents, whereby the diaphragm, when raised, uncovers the openings successively, but when depressed closes them simultaneously, substantially as and for the purpose set forth.

2. The combination of the said diaphragm and its seat, slotted nut $f$, spindle B and its pin $x$.

In testimony whereof I have signed my name to this specification in the presence of two subscribing witnesses.

JAMES PATTERSON.

Witnesses:
 WM. A. STEEL,
 HUBERT HOWSON.